United States Patent
Lin et al.

(10) Patent No.: US 12,260,535 B2
(45) Date of Patent: Mar. 25, 2025

(54) METHOD FOR DETECTING DEFECTS IN IMAGES, COMPUTER DEVICE, AND STORAGE MEDIUM

(71) Applicant: HON HAI PRECISION INDUSTRY CO., LTD., New Taipei (TW)

(72) Inventors: Tzu-Chen Lin, New Taipei (TW); Tung-Tso Tsai, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 475 days.

(21) Appl. No.: 17/748,248

(22) Filed: May 19, 2022

(65) Prior Publication Data
US 2022/0383479 A1 Dec. 1, 2022

(30) Foreign Application Priority Data
May 20, 2021 (CN) .......................... 202110554044.9

(51) Int. Cl.
*G06T 7/00* (2017.01)
*G06N 3/08* (2023.01)

(52) U.S. Cl.
CPC ............. *G06T 7/0002* (2013.01); *G06N 3/08* (2013.01); *G06T 2207/20076* (2013.01);
(Continued)

(58) Field of Classification Search
CPC ......... G06T 7/0002; G06T 2207/20076; G06T 2207/20081; G06T 2207/20084;
(Continued)

(56) References Cited

U.S. PATENT DOCUMENTS

2024/0193760 A1* 6/2024 Fukuda ................... H01L 22/00

FOREIGN PATENT DOCUMENTS

| CN | 111028213 A | * | 4/2020 | ......... G01N 21/8851 |
| CN | 109584225 B | * | 2/2023 | ............ G06T 5/002 |

OTHER PUBLICATIONS

Weisstein, Eric W. "Student's t-Distribution." From MathWorld—A Wolfram Web Resource. https://mathworld.wolfram.com/Studentst-Distribution.html (Year: 2001).*
(Continued)

*Primary Examiner* — Matthew C Bella
*Assistant Examiner* — Andrew B. Jones
(74) *Attorney, Agent, or Firm* — ScienBiziP, P.C.

(57) ABSTRACT

A method for detecting defects in images, is employed in a computer device, and stored in a storage medium. The method trains an autoencoder model using unblemished images, inputting an image to be detected into the autoencoder model, and obtaining a reconstructed image. An image error is calculated between the image to be detected and the reconstructed image, and the image error is inputted into a student's t-distribution and a calculation result is obtained. In response that the calculation result falls within a preset defect determination criterion range, the image to be detected is determined to be an unblemished image. In response that the calculation result does not fall within the preset defect determination criterion range, the image to be detected is determined to be a defective image. The method improves the efficiency and accuracy of defect detection.

17 Claims, 2 Drawing Sheets

(52) U.S. Cl.
CPC ............... *G06T 2207/20081* (2013.01); *G06T 2207/20084* (2013.01); *G06T 2207/20224* (2013.01)

(58) Field of Classification Search
CPC ......... G06T 2207/20224; G06T 7/0008; G06T 7/001; G06T 5/70; G06T 7/136; G06T 9/00; G06N 3/08; G06N 3/088; G06N 3/0455
See application file for complete search history.

(56) References Cited

OTHER PUBLICATIONS

N. Abiri, "Variational Auto-Encoders with Student's T-Prior", https://doi.org/10.48550/arXiv.2004.02581 (Year: 2019).*

* cited by examiner

METHOD FOR DETECTING DEFECTS IN IMAGES, COMPUTER DEVICE, AND STORAGE MEDIUM

FIELD

The present application relates to a technical field of product detection, and more particularly to a method for detecting defects in images, a computer device, and a storage medium.

BACKGROUND

In an industrial production process, surface defects on some products are unavoidable. Surface defects may adversely affect aesthetics of the products. In order to realize a quality control of products, appearance is very important in the industrial production process. Traditional manual detection is highly dependent on a subjective judgment of human inspectors, and also has disadvantages such as poor real-time performance and high labor cost.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in other ways other than those described herein. The scope of the present disclosure is not to be limited by the specific embodiments disclosed below. Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Figure 1:
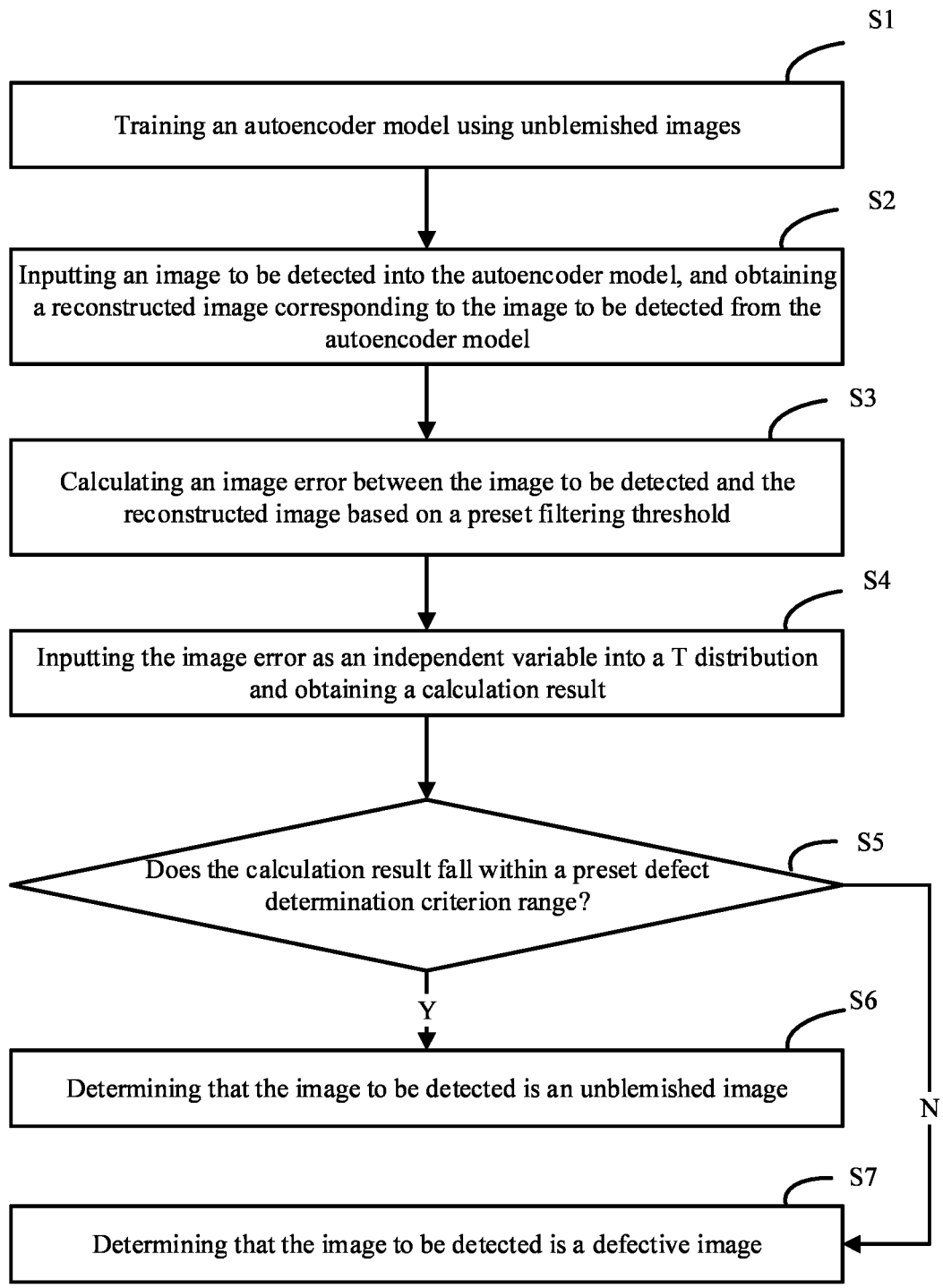
FIG. 1 is a flowchart diagram of a method for detecting defects in images in an embodiment of the present disclosure.

FIG. 1 is a flowchart diagram of a method for detecting defects in images in an embodiment of the present application.

Figure 3:
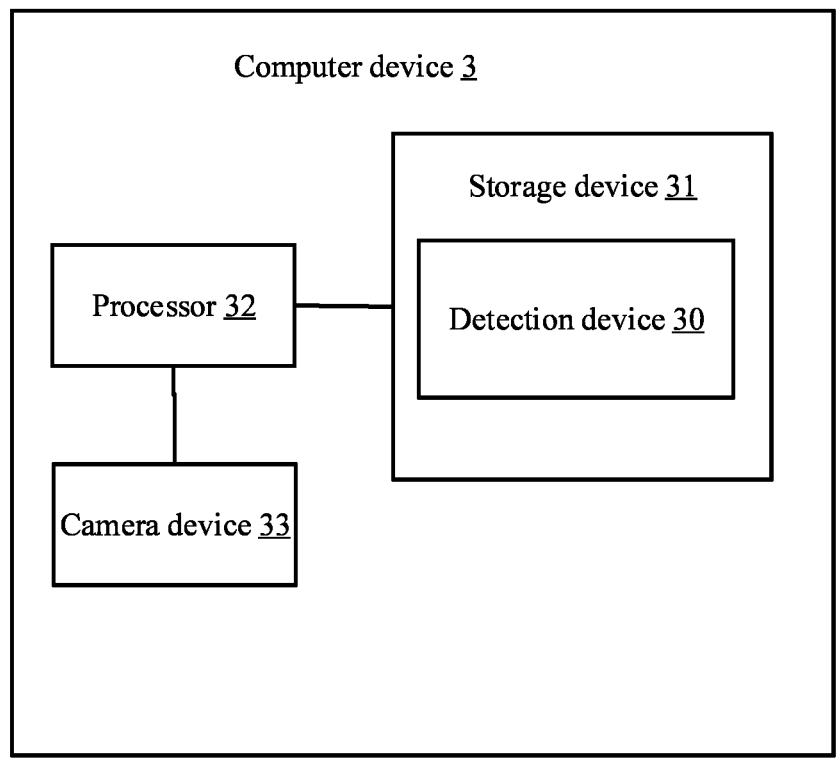
FIG. 3 is a structural diagram of a computer device housing a detection device in an embodiment of the present disclosure.

In one embodiment, the method for detecting defects in images can be applied to one or more computer devices (e.g., a computer device 3 as shown in FIG. 3), for discovering defects of products. The computer device may include hardware such as, but not limited to, a microprocessor and an Application Specific Integrated Circuit (ASIC), a Field-Programmable Gate Array (FPGA), a Digital Signal Processor (DSP), and embedded devices, for example.

The computer device may be any electronic product that can interact with a user, such as a personal computer, a tablet computer, a smart phone, a personal digital assistant (Personal Digital Assistant, PDA), a game console, and an interactive network television, Internet Protocol Television (IPTV), or smart wearable devices, for example.

The computer device may also include a network device and/or a user device. The network device includes, but is not limited to, a single network server, a server group composed of multiple network servers, or a cloud composed of a large number of hosts or network servers based on a cloud computing technology.

A network can include, but is not limited to, the Internet, a wide area network (WAN), a metropolitan area network, a local area network, and a virtual private network (VPN), for example.

In block S1, the computer device trains an autoencoder model using unblemished images.

In one embodiment, the computer device collects a preset number of unblemished images. The computer device inputs the unblemished images into the autoencoder model and obtains reconstructed images of the unblemished images, which are output by the autoencoder model. The computer device trains the autoencoder model by using a preset optimization objective function, for example, the preset optimization objective function can be $|X-X'|_1+\lambda|X-X'|_2$, where X represents each of the unblemished images, X' represents each of the reconstructed images of the unblemished images, and $\lambda$ represents a weighting, a range of the weighting $\lambda$ can be 0.1-10.

In one embodiment, the unblemished images can be acquired by capturing images of an unblemished product. Correspondingly, defective images can be acquired by capturing images of a defective product. The unblemished images can be captured by using an industrial camera. Since images generated by shooting products without defects under normal operations are normally unblemished samples, a large number (for example, 100,000) of unblemished images are obtained and can be regarded as training samples through real-time shooting.

In one embodiment, the autoencoder model may be a variational autoencoder (VAE), model and the autoencoder model includes an encoder and a decoder.

In one embodiment, the computer device performs an image processing (for example, principal component analysis dimensionality reduction) on each of the unblemished images, and an image vector corresponding to each of the unblemished images is obtained. The computer device 3 compresses the image vector of each of the unblemished images by using the encoder, and an implicit low-dimensional vector corresponding to each of the unblemished images is obtained. The computer device decodes the implicit low-dimensional vector by using the decoder, and each of the reconstructed images of the unblemished images is thereby generated.

In one embodiment, the computer device calculates an error image between each of the unblemished images and corresponding reconstructed image by using a calculation formula of X–X'. The computer device measures a sparsity of the error image, specifically, the computer device calculates a norm L1 of the error image according to a calculation formula of $|X-X'|_1$. Then the computer device measures a smoothness of the error image, that is, the computer device calculates a norm L2 of the error image according to a calculation formula of $|X-X'|_2$. The computer device calculates the error image, the norm L1 of the error image, and the norm L2 of the error image by using functions in a vision library OpenCV.

In one embodiment, in order to be compatible with the smoothness and sparsity of the error image by the autoencoder model, the computer device constructs a loss function.

For example, a preset optimization objective function is $|X-X'|_1+\lambda|X-X'|_2$, in which $\lambda$ represents a weighting, and a range of the weighting $\lambda$ can be 0.1-10. By taking different values, a balance between the smoothness and sparsity of the error image of the autoencoder model is realized. When the weighting is larger, it is smoother for the autoencoder model to train the error image. When the weighting is smaller, it is sparser for the autoencoder model to train the error image. The computer device substitutes each of the unblemished images and the corresponding reconstructed image into the preset optimization objective function of $|X-X'|_1+\lambda|X-X'|_2$. A calculated value of the preset optimization objective function represents a reconstruction error of each of the unblemished images.

In one embodiment, the computer device trains the autoencoder model, and reduces the reconstruction error of each of the unblemished images to less than a preset reconstruction error metric threshold $\tau$. This is represented as $|X-X'|_1+\lambda|X-X'|_2<\tau$. A selection of the preset reconstruction error metric threshold $\tau$ depends on an expectation of a defect detection capability of the autoencoder model, and the preset reconstruction error metric threshold $\tau$ is generally selected based on a balance between defect detection recall and accuracy. For high accuracy, a maximum value of the reconstruction error in all training samples is taken. For a high recall rate, a statistical value based on a measurement of the reconstruction error of the unblemished images is used as the preset reconstruction error metric threshold $\tau$. For example, assuming that the reconstruction error of the unblemished images obeys a Gaussian distribution, 90% of the Gaussian distribution can be used as the preset reconstruction error metric threshold $\tau$.

In block S2, the computer device inputs an image to be detected into the autoencoder model, and obtains a reconstructed image corresponding to the image to be detected from the autoencoder model.

In one embodiment, the image to be detected may be an image obtained by capturing an image of a product being examined.

In one embodiment, the computer device performs the image processing (for example, principal component analysis dimensionality reduction) on the image to be detected, and an image vector corresponding to the image to be detected is obtained. The computer device compresses the image vector of the image to be detected by using the encoder, and an implicit low-dimensional vector corresponding to the image to be detected is obtained. The computer device decodes the implicit low-dimensional vector corresponding to the image to be detected by using the decoder, and the reconstructed image of the image to be detected is thereby generated.

In block S3, the computer device calculates an image error between the image to be detected and the reconstructed image based on a preset filtering threshold.

In one embodiment, the computer device calculates a difference image between the image to be detected and the reconstructed image. The computer device obtains a binary image of the difference image based on the difference image and the preset filtering threshold, and calculates the image error based on the difference image and the binary image.

In one embodiment, the preset filtering threshold can be a preset noise filtering threshold for filtering out small amount of noise during the image processing.

In one embodiment, the computer device calculates a difference image $\Delta Y_{i,j}$ between an image Y to be detected and a reconstructed image Y' by using a Python program, i, j represents a pixel position. For example, the computer device 3 calculates the difference image $\Delta Y_{i,j}$ by using a function cv2.absdiff in the vision library OpenCV. In one embodiment, in order to filter out the smaller reconstruction error pixels, the computer device selects a filtering threshold $\epsilon$ based on the reconstruction error of the unblemished images in the training samples, and defines the binary image of the difference image $\Delta Y_{i,j}$ based on the filtering threshold $\epsilon$. The binary image is represented as:

$$\delta Y_{i,j} = \begin{cases} 1 & \Delta Y_{i,j} > \epsilon \\ 0 & \Delta Y_{i,j} \leq \epsilon \end{cases}.$$

The computer device 3 calculates the image error based on the difference image and the binary image, according to a calculation formula:

$$\frac{\sum_{i,j} \Delta Y_{i,j} * \delta Y_{i,j}}{\sum_{i,j} \delta Y_{i,j}},$$

i, j represents a pixel position.

In block S4, the computer device inputs the image error as an independent variable into a student's t-distribution and obtains a calculation result.

In one embodiment, a density function expression of the student's t-distribution is $$f(t) = \frac{\Gamma\left(\frac{v+1}{2}\right)}{\sqrt{v\pi}\,\Gamma\left(\frac{v}{2}\right)}\left(1+\frac{t^2}{v}\right)^{-\frac{(v+1)}{2}},$$

t represents the image error, $v$ represents a degree of freedom, and $\Gamma$ represents a $\Gamma$ function.

In block S5, Does the calculation result fall within a preset defect determination criterion range?

In response that the calculation result falls within a preset defect determination criterion range, the procedure goes to block S6. In response that the calculation result is outside the preset defect determination criterion range, the procedure goes to block S7.

In one embodiment, a manner of selecting the preset defect determination criterion range depends on expectations as to defect detection capability of the autoencoder model, and the selection manner of the preset defect determination criterion range can be determined based on the balance between the recall rate and the rate of accuracy of defect detection. 90% of the student's t-distribution may be used as the preset defect determination criterion range.

In one embodiment, the student's t-distribution is biased towards long-tailed distributions. For example, when a greater defect revealed in the image is detected, the image to be detected is closer to a tail end of the student's t-distribution, a distance between the image to be detected and a position where the apparent defect is located is farther from the tail end of the student's t-distribution, the greater distance means that a similarity between the image to be detected and the reconstructed image is lower.

In block S6, the computer device determines that the image to be detected is an unblemished image.

In block S7, the computer device determines that the image to be detected is a defective image.

In the above embodiments, according to a property of the student's t-distribution, the computer device detects whether there is any defect on a product by analyzing an image of the product using the autoencoder model, efficiency and accuracy of a product detection can be improved by filtering out small noise errors in the image processing.

Figure 2:
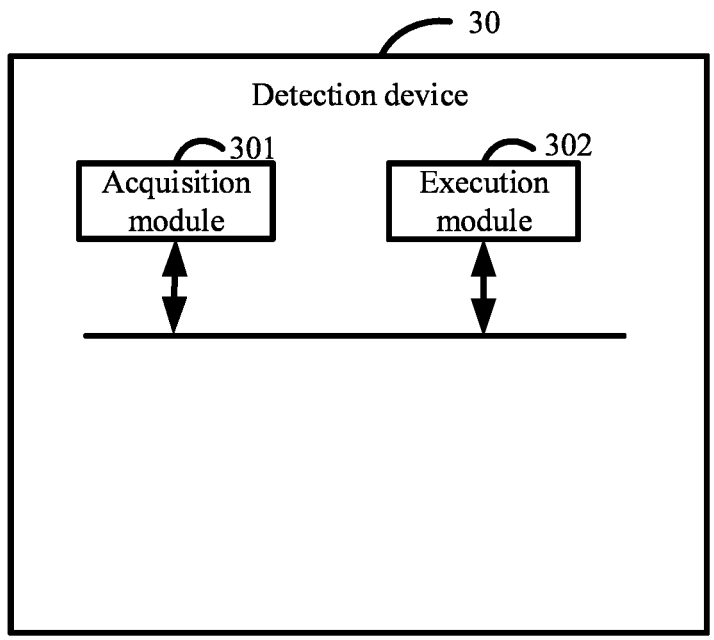
FIG. 2 is a structural diagram of a detection device in an embodiment of the present disclosure.

FIG. 2 is a structural diagram of a detection device in an embodiment of the present application.

As shown in FIG. 2, detection device 30 includes an acquisition module 301 and an execution module 302. The modules in the present application refer to one of a series of stored computer-readable instruction segments that can be executed by at least one processor and that are capable of performing preset functions. In some embodiments, the functions of each module will be described. The acquisition module 301 obtains a plurality of unblemished images and an image to be detected captured by a camera device 33. The execution module 302 trains an autoencoder model using unblemished images. The execution module 302 inputs an image to be detected into the autoencoder model, and obtains a reconstructed image corresponding to the image to be detected from the autoencoder model. The execution module 302 calculates an image error between the image to be detected and the reconstructed image based on a preset filtering threshold. The execution module 302 inputs the image error as an independent variable into a student's t-distribution and obtains a calculation result. The execution module 302 determines that the image to be detected is an unblemished image in response that the calculation result falls within a preset defect determination criterion range, and the execution module 302 determines that the image to be detected is a defective image in response that the calculation result does not fall within the preset defect determination criterion range.

FIG. 3 is a structural diagram of a computer device housing the detection device in an embodiment of the present application.

The computer device 3 may include a storage device 31, at least one processor 32, and a camera device 33. Computer-readable instructions are stored in the storage device 31 and executable by the at least one processor 32.

Those skilled in the art will understand that FIG. 3 is only an example of the computer device 3 and does not constitute a limitation on the computer device 3. Another computer device 3 may include more or fewer components than shown in the figures or may combine some components or have different components. For example, the computer device 3 may further include an input/output device, a network access device, a bus, and the like.

The at least one processor 32 can be a central processing unit (CPU), or can be other general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the computer device 3 and connects various parts of the entire computer device 3 by using various interfaces and lines.

The processor 32 executes the computer-readable instructions to implement the method for detecting defects in images in the above embodiments, such as in block S1-S7 shown in FIG. 1. Alternatively, the processor 32 executes the computer-readable instructions to implement the functions of the modules/units in the foregoing device embodiments, such as the modules 301-302 in FIG. 2.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the computer device 3. For example, the computer-readable instruction can be divided into the acquisition module 301 and the execution module 302 as shown in FIG. 2.

The storage device 31 stores the computer-readable instructions and/or modules/units. The processor 32 may run or execute the computer-readable instructions and/or modules/units stored in the storage device 31 and may call up data stored in the storage device 31 to implement various functions of the computer device 3. The storage device 31 mainly includes a program storage area and a data storage area. The storage area for programs may store an operating system, and an application program required for at least one function (such as a sound playback function, an image playback function, for example), for example. The storage area for data may store data (such as audio data, phone book data, for example) created during the use of the computer device 3. In addition, the storage device 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the computer device 3. The storage device 31 may be a memory in a physical form, such as a memory stick, or a Trans-flash Card (TF card), for example.

When the modules/units integrated into the computer device 3 are implemented in the form of independent software functional units, they can be stored in a non-transitory readable storage medium. Based on this understanding, all or some of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 31 in the computer device 3 stores a plurality of instructions to implement a method for detecting defects in images, and the processor 32 can execute the multiple instructions to: train an autoencoder model using unblemished images; input an image to be detected into the autoencoder model, and obtain a reconstructed image corresponding to the image to be detected from the autoencoder model; calculate an image error between the image to be detected and the reconstructed image based on a preset filtering threshold; input the image error as an independent variable into a student's t-distribution and obtain a calculation result; determine that the image to be detected is an unblemished image in response that the calculation result falls within a preset defect determination criterion range; and determine that the image to be detected is a defective image in response that the calculation result does not fall within the preset defect determination criterion range.

The computer-readable instructions are executed by the processor 32 to realize the functions of each module/unit in the above-mentioned device embodiments, which will not be repeated here.

In the several embodiments provided in the preset application, the disclosed computer device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, not a particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for detecting defects in images, the method comprising:
   training an autoencoder model using unblemished images;
   inputting an image to be detected into the autoencoder model, and obtaining a reconstructed image corresponding to the image to be detected from the autoencoder model;
   calculating an image error between the image to be detected and the reconstructed image based on a preset filtering threshold, comprising: calculating a difference image between the image to be detected and the reconstructed image; obtaining a binary image of the difference image based on the difference image and the preset filtering threshold; and calculating the image error based on the difference image and the binary image;
   inputting the image error as an independent variable into a student's t-distribution and obtaining a calculation result;
   determining that the image to be detected is an unblemished image in response that the calculation result falls within a preset defect determination criterion range; and
   determining that the image to be detected is a defective image in response that the calculation result does not fall within the preset defect determination criterion range.

2. The method for detecting defects in images of claim 1, wherein training the autoencoder model using unblemished images comprises:
   inputting the unblemished images into the autoencoder model and obtaining reconstructed images of the unblemished images;
   training the autoencoder model by using a preset optimization objective function, wherein the preset optimization objective function is:
   $|X-X'|_1+\lambda|X-X'|_2$, X represents each of the unblemished images, X' represents each of the reconstructed images of the unblemished images, and $\lambda$ represents a weighting.

3. The method for detecting defects in images of claim 2, wherein a range of the weighting $\lambda$ is 0.1-10.

4. The method for detecting defects in images of claim 1, wherein a calculation formula of the image error is:

$$\frac{\sum_{i,j} \Delta Y_{i,j} * \delta Y_{i,j}}{\sum_{i,j} \delta Y_{i,j}},$$

wherein $\Delta Y_{i,j}$ represents the difference image, $\delta Y_{i,j}$ represents the binary image, and i, j represents a pixel position.

5. The method for detecting defects in images of claim 4, wherein the binary image is represented as:

$$\delta Y_{i,j} = \begin{cases} 1 & \Delta Y_{i,j} > \epsilon \\ 0 & \Delta Y_{i,j} \le \epsilon \end{cases},$$

wherein $\epsilon$ represents the preset filtering threshold.

6. The method for detecting defects in images of claim 1, wherein a density function expression of the student's t-distribution is:

$$f(t) = \frac{\Gamma\left(\frac{v+1}{2}\right)}{\sqrt{v\pi}\,\Gamma\left(\frac{v}{2}\right)} \left(1 + \frac{t^2}{v}\right)^{-\frac{(v+1)}{2}},$$

wherein t represents the image error, v represents a degree of freedom, and $\Gamma$ represents a $\Gamma$ function.

7. The method for detecting defects in images of claim 6, wherein a preset value of the degree of freedom $\lambda$ is 1.

8. A computer device comprising:
   a processor; and a storage device storing a plurality of instructions, which when executed by the processor, cause the processor to:
   train an autoencoder model using unblemished images;
   input an image to be detected into the autoencoder model, and obtain a reconstructed image corresponding to the image to be detected from the autoencoder model;
   calculate an image error between the image to be detected and the reconstructed image based on a preset filtering threshold, comprising; calculate a difference image between the image to be detected and the reconstructed image; obtain a binary image of the difference image based on the difference image and the preset filtering threshold; and calculate the image error based on the difference image and the binary image;
   input the image error as an independent variable into a student's t-distribution and obtain a calculation result;
   determine that the image to be detected is an unblemished image in response that the calculation result falls within a preset defect determination criterion range; and
   determine that the image to be detected is a defective image in response that the calculation result does not fall within the preset defect determination criterion range.

9. The computer device of claim 8, wherein the processor is further caused to:
   input the unblemished images into the autoencoder model and obtain reconstructed images of the unblemished images;
   train the autoencoder model by using a preset optimization objective function, wherein the preset optimization objective function is:
   $|X-X'|_1 + \lambda |X-X'|_2$, X represents each of the unblemished images, X' represents each of the reconstructed images of the unblemished images, and $\lambda$ represents a weighting.

10. The computer device of claim 8, wherein a calculation formula of the image error is:

$$\frac{\sum_{i,j} \Delta Y_{i,j} * \delta Y_{i,j}}{\sum_{i,j} \delta Y_{i,j}},$$

wherein $\Delta Y_{i,j}$ represents the difference image, $\delta Y_{i,j}$ represents the binary image, and i, j represents a pixel position.

11. The computer device of claim 10, wherein the binary image is represented as:

$$\delta Y_{i,j} = \begin{cases} 1 & \Delta Y_{i,j} > \epsilon \\ 0 & \Delta Y_{i,j} \leq \epsilon \end{cases},$$

wherein $\epsilon$ represents the preset filtering threshold.

12. The computer device of claim 8, wherein a density function expression of the student's t-distribution is:

$$f(t) = \frac{\Gamma\left(\frac{v+1}{2}\right)}{\sqrt{v\pi}\,\Gamma\left(\frac{v}{2}\right)} \left(1 + \frac{t^2}{v}\right)^{-\frac{(v+1)}{2}},$$

wherein t represents the image error, v represents a degree of freedom, and $\Gamma$ represents a $\Gamma$ function.

13. A non-transitory storage medium having stored thereon at least one computer-readable instructions, which when executed by a processor of a computer device, causes the processor to perform a method for detecting defects in images, the method comprising:
   training an autoencoder model using unblemished images;
   inputting an image to be detected into the autoencoder model, and obtaining a reconstructed image corresponding to the image to be detected from the autoencoder model;
   calculating an image error between the image to be detected and the reconstructed image based on a preset filtering threshold, comprising: calculating a difference image between the image to be detected and the reconstructed image; obtaining a binary image of the difference image based on the difference image and the preset filtering threshold; and calculating the image error based on the difference image and the binary image;
   inputting the image error as an independent variable into a student's t-distribution and obtaining a calculation result;
   determining that the image to be detected is an unblemished image in response that the calculation result falls within a preset defect determination criterion range; and
   determining that the image to be detected is a defective image in response that the calculation result does not fall within the preset defect determination criterion range.

14. The non-transitory storage medium of claim 13, wherein training the autoencoder model using unblemished images comprises:
   inputting the unblemished images into the autoencoder model and obtaining reconstructed images of the unblemished images;
   training the autoencoder model by using a preset optimization objective function, wherein the preset optimization objective function is:
   $|X-X'|_1 + \lambda |X-X'|_2$, X represents each of the unblemished images, X' represents each of the reconstructed images of the unblemished images, and A represents a weighting.

15. The non-transitory storage medium of claim 13, wherein a calculation formula of the image error is:

$$\frac{\sum_{i,j} \Delta Y_{i,j} * \delta Y_{i,j}}{\sum_{i,j} \delta Y_{i,j}},$$

wherein $\Delta Y_{i,j}$ represents the difference image, $\delta Y_{i,j}$ represents the binary image, and i, j represents a pixel position.

16. The non-transitory storage medium of claim 15, wherein the binary image is represented as:

$$\delta Y_{i,j} = \begin{cases} 1 & \Delta Y_{i,j} > \epsilon \\ 0 & \Delta Y_{i,j} \leq \epsilon \end{cases},$$

wherein $\epsilon$ represents the preset filtering threshold.

17. The non-transitory storage medium of claim 13, wherein a density function expression of the student's t-distribution is:

$$f(t) = \frac{\Gamma\left(\frac{v+1}{2}\right)}{\sqrt{v\pi}\,\Gamma\left(\frac{v}{2}\right)}\left(1 + \frac{t^2}{v}\right)^{\frac{-(v+1)}{2}},$$

wherein t represents the image error, ν represents a degree of freedom, and Γ represents a Γ function.

* * * * *